INVENTOR.
FAUST ROSA

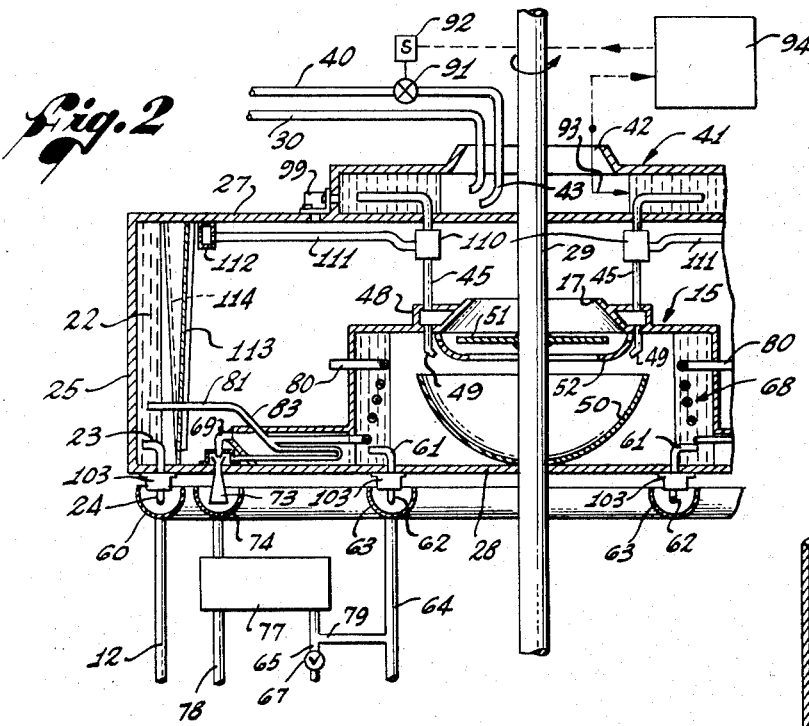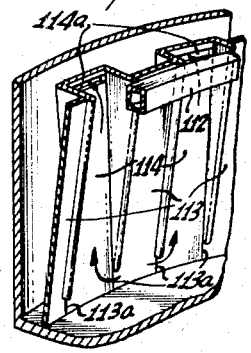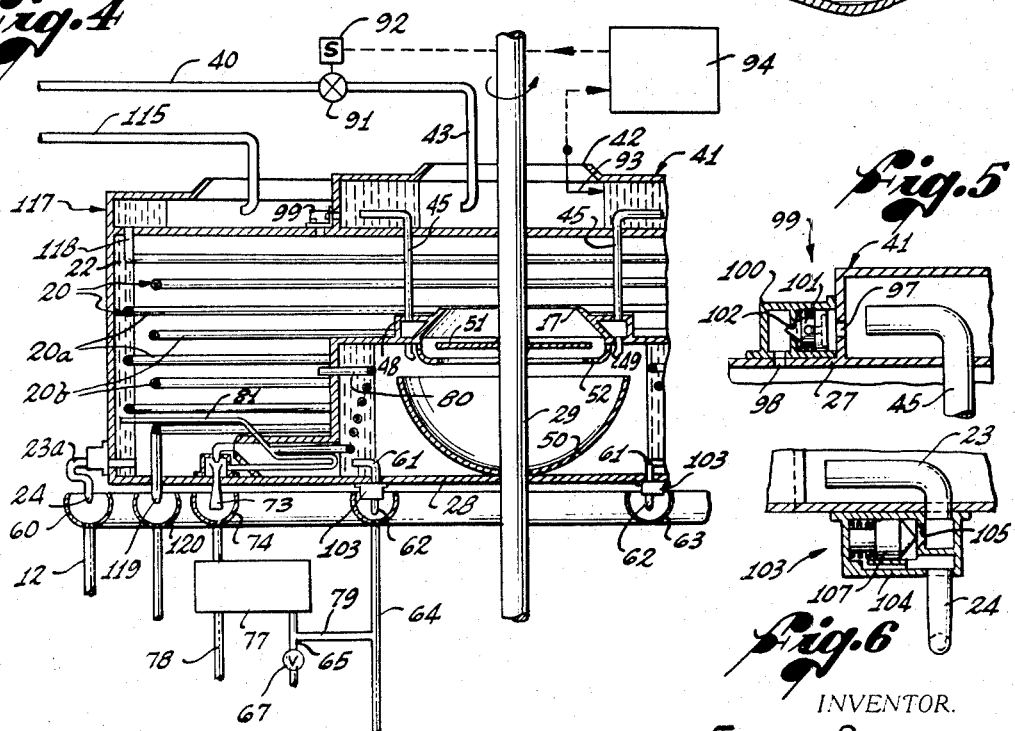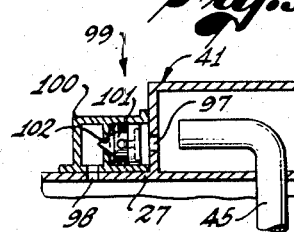
INVENTOR.
FAUST ROSA
BY Fulwider Patton, Rieber Lee, and Utecht
ATTORNEYS

United States Patent Office 3,725,209
Patented Apr. 3, 1973

3,725,209
CENTRIFUGAL DISTILLATION SYSTEM
Faust Rosa, Northridge, Calif.
(4977 Battery Lane, Apt. 910, Bethesda, Md. 20014)
Filed Aug. 11, 1970, Ser. No. 62,814
Int. Cl. B01d 3/10
U.S. Cl. 203—24
35 Claims

ABSTRACT OF THE DISCLOSURE

Distillation of fresh water from seawater by introducing the seawater into an evaporating zone defined in the central portion of a sealed rotary drum to vaporize water into a vapor space within the drum, and confining unevaporated liquid in the evaporating zone while centrifugally compressing vapor in a condensing zone around the evaporating zone and condensing the vapor on heat exchange coils with cooler liquid circulated therethrough. In a one-stage embodiment, collected liquid from the evaporating zone is circulated through the coils, while modified embodiments use similar rotary drums as heat pumps for preparing liquid for distillation in at least one preliminary stage.

BACKGROUND OF THE INVENTION

This invention relates to the purification of liquids, and has particular reference to the separation of water from a distilland solution such as seawater or the like.

Large scale commercial desalinization of seawater presently is being accomplished most economically by variations of basic distillation processes, notably the multiple effect long tube vertical process and the vapor-compression distillation process. Another variation is thermal recompression distillation as practiced with centrifugal barrier compression stills of the types shown in U.S. Pats. Nos. 2,734,023 and 3,200,050 in which liquid distilland is flowed centrifugally in a film across one side of a rotating disk to produce vapor which then is passed through a compressor and returned to the opposite side of the disk to condense thereon as a distillate.

The cost of the purified water produced by these conventional processes and the various types of apparatus with which they are practiced remains relatively high, primarily because of high capital expenditures required, the cost of energy required in operation, and other operating costs including maintenance.

SUMMARY OF THE INVENTION

The present invention resides in an improved apparatus and process for producing purified water more economically by low temperature, low pressure distillation using a combination of flash evaporation and vapor compression and condensation, and using centrifugal force in a novel manner to reduce the driving potentials required to vaporize water from seawater or the like and then to condense the vapor for withdrawal and use. In general, the invention provides a void or vapor space within a rotating enclosure, introduces the distilland into an evaporating zone in the central portion of the enclosure to cause part of the distilland to flash into vapor, and condenses the vapor in a condensing zone around the evaporating zone by a combination of centrifugal compression developed by the rotating enclosure and circulating of distilland through the condensing zone in heat-exchanging relation with the vapor and condensed distillate therein.

More specifically, the preferred embodiment of the apparatus of the present invention comprises a sealed rotary drum having a coaxially mounted, open ended internal evaporating container, means for spraying distilland into the container and onto a deflector therein for promoting vaporization, heat exchange coils in the outer portion of the interior of the drum for condensing contact with the vapor that escapes from the container and is forced centrifugally outwardly within the drum, and means for circulating cooled distilland from an annular layer collected in the container through the heat exchanger coils to cool the latter and condense the vapor as distillate. The condensed distillate accumulates in a second annular layer around the condensing zone, from which it is withdrawn from the apparatus through liquid-sealed traps, and the distilland that has passed through the heat exchange coils is recycled through the evaporating zone for further processing.

A primary feature of the invention is the formation and maintenance of the vapor space within the rotating enclosure with vapor phase contact in the space with both the disttilland and distillate liquid surfaces. In the preferred method, this space is produced by completely filling the enclosure with start-up liquid and centrifugally discharging most of the liquid through liquid-sealed traps which prevent entry of air. The vapor space thus forms as a vapor-filled low-pressure void which grows radially within the enclosure and extends from the central evaporating zone through the outer condensing zone.

Other aspects of the invention include the removal of non-condensable gases from the vapor space, and solids from the distilland, and discharge for such gases and solids from the apparatus, the circulation of distilland through the heat exchange coils and recycling through the evaporating zone while maintaining a high rate of liquid surface turnover in this zone, and the feeding of additional distilland into the rotating enclosure to sustain a continuous operation. The result is a compact, relatively inexpensive, and structurally simple apparatus which reduces the required driving potentials and significantly improves heat transfer efficiency and mass transport capability.

One modification of the preferred embodiment of the apparatus operates on the same principles as a heat pump for refrigerating a portion of the input liquid by vaporization while heating the remainder by vapor condensation, and a second modification is designed primarily as a distillation unit to receive preheated distilland as an input feed and refrigerated distilland as a condensing feed. These modifications are combined in a distillation system with one or more heat pump stages preparing liquid for the distillation stage.

Other objects and advantages of the invention will become apparent from the following detailed description, taken in conjunction with the accompanying drawings.

BRIEF DESCRIPTION OF THE DRAWINGS

FIG. 2 is a fragmentary schematic cross-sectional view similar to part of FIG. 1, on a reduced scale, and illustrating a modification of the invention to serve primarily as a heat pump stage;

FIG. 3 is an enlarged fragmentary view of part of FIG. 2 illustrating in more detail part of the first modification;

FIG. 4 is a fragmentary schematic view similar to FIG. 2 showing a second modification of the invention designed primarily as a distillation unit for use in combination with one or more heat pump stages;

FIGS. 5 and 6 are enlarged cross-sectional views showing details of illustrative centrifugally operated valves shown schematically in FIGS. 1, 2 and 4;

DETAILED DESCRIPTION

Figure 1:
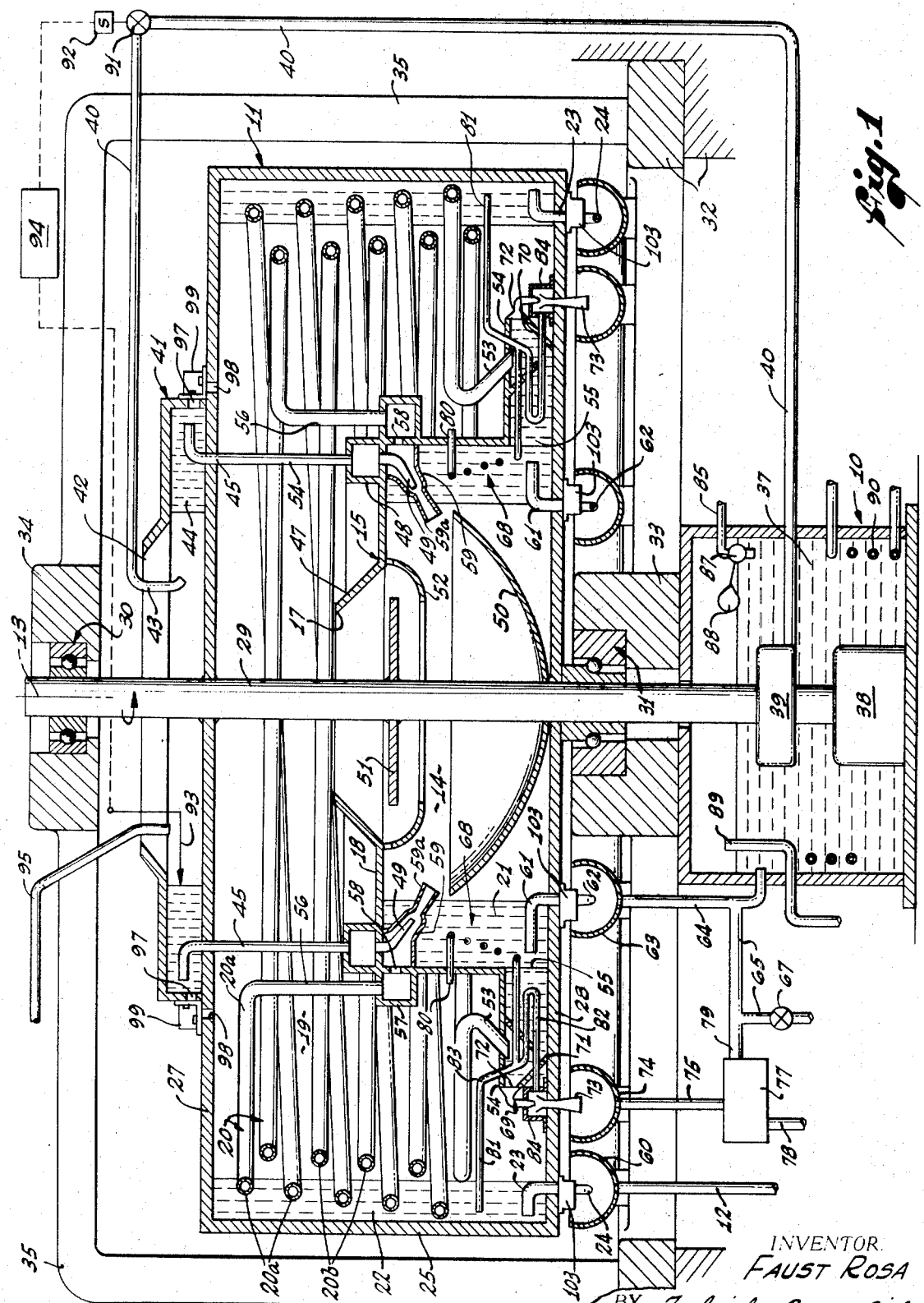
FIG. 1 is a fragmentary schematic cross-sectional view taken in a vertical plane substantially through the axis of rotation of an apparatus embodying the novel features of the present invention.

Shown in the drawings for purposes of illustration is an improved vapor-compression distillation apparatus having a reservoir 10 for receiving a distilland liquid such as seawater from which pure water is to be removed as distillate, and a sealed body or enclosure 11 in which water is first removed from the distilland as vapor and then is compressed and condensed as distillate. The distillate is collected and removed from the apparatus for delivery to a using or storage system (not shown) through an output pipe 12.

The enclosure 11 is a drum that is supported for rotation at high speed about a central axis 13 and is internally partitioned into a central evaporating zone 14 inside an evaporating container 15 having an opening 17 in one end 18, and an outer condensing zone 19 surrounding the evaporating container and having a liquid-circulating heat exchanger 20 therein for condensing water vapor that is evaporated from distilland in the evaporating zone 14. The drum 11 first is purged of air to create a reduced pressure vapor space in the evaporating zone and extending into the condensing zone, and distilland is sprayed into the evaporating zone and collected in an annular layer 21 inside the evaporating container while the vapor thus formed in the vapor space is centrifugally compressed in the condensing zone and condensed on the heat exchanger 20 through which distilland from the layer 21 is circulated. The resulting condensate, in turn, is centrifugally collected in a second annular layer 22 around the condensing zone and is withdrawn through liquid-sealed traps 23 and eject nozzles 24 for delivery to the output pipe 12.

As shown in FIG. 1, the drum 11 herein has an upright cylindrical sidewall 25 and upper and lower end walls 27 and 28 through which a vertical supporting shaft 29 projects to define the axis 13 of rotation of the drum. Above and below the drum, the shaft is journaled in suitable bearings 30 and 31 which are mounted on an external supporting structure including a base 32, a lower support ring 33 housing the lower bearing 31, and an upper support ring 34 housing the upper bearing 30 and mounted in overlying relation with the drum by a plurality of inverted L-shaped posts 35 upstanding from the base 32 around the drum.

The reservoir 10 is shown as a tank positioned immediately beneath the lower support ring 33 with the lower end portion of the shaft 29 projecting through the upper end wall of the tank and into the liquid 37 therein. To drive the shaft and rotate the drum 11, a suitable motor 38 is coupled to the lower end of the shaft, and herein is immersed in the liquid within the tank. Thus, when the motor is operating, the shaft is rotated within the bearings 30 and 31 in axially fixed relation, and the drum rotates at the same rate about the axis 13.

Also driven by the motor 38 is an immersion-type centrifugal pump 39 which is mounted in the reservoir tank 10 and directly coupled to the shaft 29 above the motor. The intake port (not shown) of this pump communicates with the liquid in the tank, and its output port communicates with a feed pipe 40 which extends laterally out of the tank, upwardly along one side of the drum, and then partially across the top of the drum to discharge liquid from the tank into a rotary input pump 41 mounted on and rotating with the drum. Through this pump, the liquid is introduced into the interior of the drum and into the evaporating container 15 therein.

Herein, the input pump 41 comprises a cylinder coaxial with the drum 11 and having an inlet opening 42 in its upper side into which the outlet end portion 43 of the feed pipe 40 extends, and defining an open chamber into which the feed pipe discharges the distilland from the reservoir tank 10. When the drum and the pump cylinder are rotated at high speed, the liquid in the pump chamber is driven radially outwardly by centrifugal force to form an annular layer 44 of the liquid around the inner side of the cylinder. A plurality of inlet pipes 45 are mounted on the drum 11 with open upper ends immersed in this layer adjacent the sidewall of the pump cylinder and with lower end portions extending through the upper end wall and downwardly inside the drum toward the evaporating container 15. Thus, the centrifugal force on the liquid layer causes distilland to flow from the layer through the inlet pipes while maintaining an effective liquid seal preventing entry of outside air through the inlet pipes.

It will be seen in FIG. 1 that the evaporating container 15 is considerably smaller in diameter than the drum 11 and is coaxially mounted in the latter in spaced relation with both the upper end wall 27 and the outer sidewall 25, leaving open space above the container and around its outer side. The opening 17 is formed in the center of the upper wall of the container, with clearance around the shaft 29, and is bounded by an upwardly tapering flange 47. The lower end portion of the container rests on and is fastened to (and is closed by) the lower end wall 28 of the drum.

To introduce the distilland from the inlet pipes 45 into the evaporating container 15, a hollow annular header 48 is mounted on the upper wall of the container and the inlet pipes open into this header through the top wall thereof so as to deliver the distilland to the header under pressure. Spaced around the underside of the header, under the upper wall of the evaporating container, are a plurality of liquid jet pumps each including a drive jet or spray nozzle 49 having an upper end which opens upwardly into the header to receive distilland therefrom, and a lower end through which the distilland is sprayed into the container. The lower end portions of these nozzles preferably are inclined inwardly and downwardly within the container to direct all of the sprays toward the lower central portion of the container.

Centrally mounted in the container 15 around the shaft 29 is an upwardly dished or concave deflector 50 into which the sprays are directed. With the sprays directed into this deflector while the drum is rotating at high speed, the portion of the sprays received by the deflector is spread centrifugally on the concave side to optimize evaporation within the container. That portion of the distilland which does not vaporize is driven outwardly within the container by centrifugal force to collect in the annular layer 21 on the inner side of the cylindrical sidewall of the container.

Of course, vaporization is obtained not only in the sprays and on the deflector plate 50 but also at the interface between the layer 21 and the vapor space within the evaporating container, and the resulting vapor escapes from the evaporating container 15 through the opening 17 to fill the remainder of the vapor space in the drum 11.

Suitable baffles 51 and 52 beneath the opening 17 facilitate the separation of liquid distilland spray from the escaping vapor, and prevent the escape of any significant amount of distilland from the evaporating container. As an incident to vaporization in the evaporation chamber, the distilland is cooled by loss of sensible heat to supply the required heat of vaporization.

In the portion of the vapor space outside the evaporating container 15, the water vapor liberated from the distilland is subjected to the centrifugal force developed by the rotating drum 11, and thus is driven radially outwardly toward the cylindrical sidewall 25 of the drum, thus being centrifugally compressed in the outer portion of the vapor space. To amplify such compression, vanes (not shown) may be mounted in the vapor space between the container and the outwardly spaced condensing zone. Accordingly, the vapor pressure and temperature are increased by compression as the vapor flows toward and into the condensing zone 19 and toward the heat exchanger 20 therein.

In this instance, the heat exchanger 20 comprises two coils 20a and 20b of heat conductive tubing disposed in the radially outer portion of the interior of the drum 11, one coil (20a) being positioned closely adjacent the sidewall 25 of the drum and the other (20b) being spaced inwardly a short distance from the outer coil. Each of these coils has a lower, inlet end 53 which receives cooled distilland that has been collected in the annular layer 21 in the evaporating container 15, two inlet headers 54 being mounted on the lower end of the container in radially outwardly extending relation and having open sides at 55 opening into the container to receive the distilland. The inlet ends 53 of the coils open downwardly into these headers between the open sides and the outer closed ends thereof so that distilland can flow upwardly into and circulate through the coils, each of which spirals upwardly through the condensing zone 19 with a progressively decreasing radius to promote convective flow of distilland upwardly through the coil.

In addition, positive suction is applied to the upper or outlet end portion 56 of each heat exchanger coil 20a, 20b to draw the distilland through the coils and then mix it back into the feed stream introduced into the evaporating container 15 through the nozzles 49, thereby recycling the distilland through the evaporating zone. For these purposes, the upper end portion of each coil extends radially inwardly, back toward the evaporating container, and then downwardly to a hollow annular return header 57 wrapped around the evaporating container just below the upper wall 18 thereof. The coils open into the header through the top thereof, and the interior of the header communicates through ports 58 in the container with chambers defined by tubular casings 59 surrounding the several drive jet nozzles 49.

The tubular casings 59 extend beyond the tips of the jet nozzles 49 and form liquid jet pumps for entraining liquid around the jet nozzles in the streams of liquid leaving the nozzles and discharging the entrained liquid through diffuser nozzles 59a formed by the ends of the casings. In this manner, liquid is drawn from the tubular casings 59, and thus from the return header 57, to reduce the pressure in the header and apply this reduced pressure, or suction, to the upper end portions of the heat exchanger coils. Thus, this suction cooperates with the centrifugal and convective pumping actions to circulate cooled distilland through the condensing zone 19 in heat-exchanging relation with the heated vapor and distillate therein, and to recycle the distilland (now heated by the vapor) back through the evaporating zone 14 through the diffuser nozzles 59a. At the same time, this maintains a high rate of liquid surface turnover in the evaporating zone 14. While the foregoing is the preferred arrangement for circulating distilland through the heat exchanger, it will be evident to those skilled in the art that another type of pump might be substituted for the jet-type pumps shown and described herein.

It can be seen in FIG. 1 that the outer heat exchange coil 20a is completely immersed in the annular layer 22 of distillate collected centrifugally along the inner surface of the sidewall 25 of the drum 11, thus effecting heat transfer through the tubing forming the outer coil, while the inner coil 20b is positioned almost entirely outside this layer in the vapor space adjacent the surface of the layer, this being the location of the highest vapor pressure and temperature in the vapor space. Vapor thus condenses as distillate on the inner coil and is thrown off centrifugally into the layer 22, thereby maintaining, at most, a thin film of condensate for a high heat transfer coefficient between the coil and the surrounding vapor. The droplets thrown from the coil also serve as a cooling spray with respect to the surrounding vapor.

Since the liquid layer 22 is cooled by the outer coil 20a, condensation also occurs at the interface between the layer and the vapor. This results in additional net condensation from the condensing zone.

Withdrawal of distillate from the layer 22 is accomplished by means of a plurality of L-shaped outlet pipes mounted in the lower end wall 28 of the drum 11 and forming the liquid-sealed traps 23, the pipes having open upper ends immersed in the layer 22 adjacent the sidewall of the drum, and outlet ends forming the eject nozzles 24 outside the drum for discharging the liquid that flows through the pipes into an annular gutter 60 beneath and coaxial with the drum. From the open upper ends, these pipes extend radially inwardly to the desired position of the surface of the layer 22, and then bend downwardly and extend vertically through the lower end wall 28, thus forming the liquid seals or traps which utilize the liquid pressure in the layer 22 (higher than atmospheric pressure outside the drum) to prevent any influx of air while permitting a continuous outflow of liquid to the gutter and thence into the output pipe 12. Accordingly, the rate of outflow is determined by the rate of vapor condensation in the condensing zone 19.

To control the radial depth of the layer 21 of distilland in the evaporating container 15, similar L-shaped outlet pipes 61 are mounted in the lower end wall 28 beneath the evaporating container with open upper ends immersed in the layer 21 adjacent the sidewall of the container. From its upper end, each of these pipes extends radially inwardly to the desired level of the surface of the layer and then bends downwardly and extends vertically through the lower end wall with an open lower end 62 forming an eject nozzle over-lying a second annular gutter 63 coaxial with the drum 11. Again, the L-shaped pipes form liquid seals or traps which prevent outside air from entering while permitting a continuous outflow of distilland when the volume of liquid introduced into the evaporating zone 14 exceeds the combined outflows from the evaporating zone.

The distilland that is removed from the layer 21 through the pipes 61 flows from the gutter 63 into a return pipe 64 for delivery either to the reservoir 10, in which it is mixed with additional seawater for recycling, or to a branch pipe 65 for removal from the system. A suitable flow control valve 67 determines the proportion of the distilland that is removed from the system and the proportion that is to be recycled.

It is desirable in a system of this type to provide for removal of solids and non-condensable gases that are introduced into the apparatus with the feed of liquid, and for this purpose the apparatus may include both a degasser 68 and a separator 69 for solids precipitated in the evaporating container 15. The illustrative solids separator is incorporated in the inlet headers 54 at the lower end of the evaporating container, into which precipitated solids are drawn during operation of the apparatus. Depending from the top wall of each header, radially inwardly from the heat exchanger inlet 53, is a baffle plate 70 that is inclined downwardly and outwardly to deflect solids away from the inlet 53 and minimize the amount of solids that is drawn into the heat exchanger.

Outwardly beyond the heat exchanger inlet, the outer wall 71 of the header is inclined upwardly and outwardly to a solids outlet 72, and L-shaped outlet pipes forming exhauster jets are mounted outside the headers to receive combined flows of liquid and solids through the solids outlets and direct the flows as exhauster drive jets into downwardly extending exhauster nozzles 73 projecting through the lower end wall 28 of the drum. A third gutter 74 below these nozzles collects the ejected flows and delivers the same through a pipe 75 to a receiver 77 for disposal through a pipe 78. The liquid may be separated from the solids and returned to the system through a lateral pipe 79 communicating with the valve-controlled pipe 65, or may be discharged with the solids.

The representative degasser 68 comprises a pair of intercoiled condenser tubes disposed in the distilland layer 21 and each having an open upper end 80 which extends through the sidewall of the evaporating container 15 and thus communicates with the vapor space around the container. The coiled portions of these tubes extend spirally downwardly through the distilland layer with progressively increasing diameters to permit liquid flow in the tubes without liquid traps, and the lower end portion of each tube extends radially outwardly into one of the headers 54 and is connected to a branch pipe, the legs 81 and 82 of which are vertically spaced and are connected by a crosspiece 83 that is inclined upwardly and outwardly.

The lower leg 82 of the branch is a U-shaped bend which extends first inwardly and then back outwardly through the inclined end wall 71 of the header, and opens into an exhauster chamber 84 around the open upper end of the associated exhauster nozzle 73, the separator pipes 69 being spaced from the nozzles 73 to produce suction which draws fluid from the chamber 84 into the exhauster nozzles. In this manner, suction is applied to the condenser tubes 68 to draw non-condensable gases from the vapor space outside the evaporating container 15, together with a greater amount of water vapor which is condensed in the tubes while passing through the distilland layer 21. At the junction with the cross-piece 83 of the branch pipe, most of the condensed vapor is driven upwardly and outwardly into the upper leg 81 of the branch and is delivered to the distillate layer 22.

The non-condensable gases, being unable to enter the distillate layer to any significant extent, are drawn out of the branch through the lower U-shaped leg 82 and discharged from the drum through the associated nozzle 73. It will be evident to those skilled in the art that this is merely one approach to degassing, and that other approaches may be used to accomplish substantially the same result.

A pipe 85 is provided to feed seawater into the reservoir 10 and is equipped with a level-control valve 87 having a float 88 which rides on the surface of the liquid 37 in the reservoir and opens and closes the valve in response to rises and falls in the level, thereby maintaining the level substantially the same, and well above the intake of the pump 39. An overflow pipe 89 also is provided to discharge excess liquid from the reservoir, for example, when a high rate of flow is delivered to the reservoir through the return pipe 64 as may occur during start-up of the apparatus from a filled condition. As an optional component, a heat exchanger coil 90 may be included in the reservoir for heat exchange between an external source and the liquid in the reservoir, or to recover heat from the distillate discharged through the output pipe 12.

To control the rate of feed of liquid from the reservoir 10 through the pipe 40 to the input pump 41 on top of the drum 11, a valve 91 is interposed in the pipe 40 and operated by a solenoid 92 which opens and closes the valve in response to sensed variations in the radial depth of the annular layer 44 in the input pump. For this purpose, a liquid level probe 93 of any well known type is disposed in the pump to sense and signal changes in the position of the surface of the liquid, and the signals are delivered to a controller 94 which energizes and deenergizes the solenoid 92 as required to maintain the radial depth substantially constant.

While there are different ways to develop the void or vapor space within the drum 11, a feature of the invention is the formation of this vapor space by the centrifugal discharge of fluid from the drum through the various liquid-sealed outlets, preferably from a start-up condition in which the drum is filled with fresh water. Fill water is supplied to the input pump 41 through a fill pipe 95 from a suitable source (not shown), and flows from the pump into the drum through ports 97 and 98 in the sidewall of the pump and in the upper end wall 27 of the drum, the flow through these ports being controlled by valves 99 which are open for the initial fill.

Preferably, the valves 99 are centrifugally closed valves such as that shown in FIG. 5, each having a hollow housing 100 with a valve-closing plunger 101 spring-urged radially inwardly to open a flow port 102 in a partition in the housing. This permits liquid to flow from the pump into the drum through the port 97, the port 102, and the port 98 when the drum is below a selected speed of rotation. The spring opening force is correlated with the centrifugal force and liquid pressure developed in the pump to close the valves 99 and shut off the flows therethrough when the drum attains the selected speed of rotation.

The distillate outlets 23, 24 and the distilland outlets 61, 62 are provided with control valves 103 for closing these outlets while the drum is stationary and thereby trapping fill water in the drum. Preferably, these are centrifugally opened valves, and may be of the type shown in FIG. 6 including a housing 104 in which a port 105 communicates between the upper, inlet end portion 23 of the outlet pipe and the lower, outlet portion 24 thereof, with a spring-loaded valve member 107 normally urged closed, i.e., toward the port 105, but arranged to be moved away from the port to an open position by the force developed as the drum is accelerated toward its operating speed.

Although such valves also could be provided to control the exhauster jets 73, the rate of flow from these jets can be made sufficiently less than the fill rate to permit complete filling without excessive loss through the jets. Air displaced from the drum during filling escapes primarily through the fill valves 99.

Figure 9:
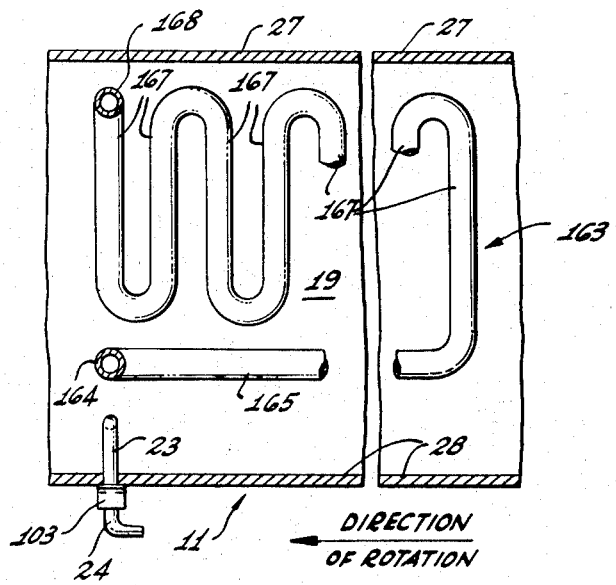
FIG. 9 is a fragmentary cross-section, partially broken away, taken generally along the line 9—9 of FIG. 8.
Figure 11:
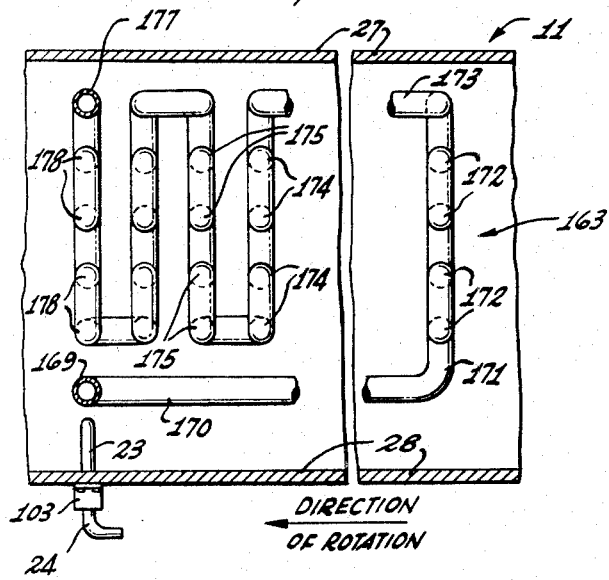
FIG. 11 is a view similar to FIG. 9, taken substantially along the line 11—11 of FIG. 10.

With the foregoing arrangement, the fill water purges the drum 11 of air by displacing the air from the drum and completely occupying the interior thereof. Then the drum is accelerated to its operating speed with the input pump 41 filled with water to a level above the inlet ends of the pipes 45 so as to maintain liquid seals preventing entry of air through these pipes. The valves 99 close and the valves 103 open to permit liquid to be discharged from the drum, so that the interior of the drum is completely sealed against entry of air, but the liquid-sealed nozzles 24 and 62 and the jets 73 are open to permit the discharge of liquid from the drum. The nozzles 24 and 62 preferably discharge the liquid rearwardly, relative to the direction of drum rotation, for recovery of kinetic energy as a result of the jet action, as shown in FIGS. 9 and 11.

As the drum 11 is thus accelerated, the liquid in the drum is centrifugally accelerated to create a pressure gradient in the drum directed toward the radial extremities of the interior of the drum. Accordingly, the liquid is discharged through the outlets 24 and 62 and the jets 73, and a void forms in the central portion of the drum and grows radially as liquid is ejected. At the same time, this void is filled with saturated water vapor at a vapor pressure depending upon the temperature of the liquid, a partial vacuum when the liquid is below its normal boiling point.

As soon as the radius of the vapor space exceeds the radius of the outlet opening 17 in the top wall 18 of the evaporating container 15, the distillate and distilland liquid systems are separated and the void becomes a common vapor space. The liquid continues to be ejected from the container 15 through the outlets and the nozzles 73, and also continues to be ejected from the drum outside the container through the outlets 24, until a pressure-balanced condition is obtained, as illustrated generally in FIG. 1.

When fresh water is used as the initial fill liquid, as is preferred, the start-up procedure is complete and normal operation begins when the annular liquid layers 21 and 22 have been established as shown in FIG. 1 and the flow of salt water from the reservoir 10 is initiated by the controller 94, which opens the solenoid-operated valve 91 in response to a signal from the probe 93 indicating that the layer 44 in the pump 41 has attained the minimum radial depth for which the probe is set.

It should be noted that start-up may be accomplished without complete initial fill if sufficient liquid is introduced to fill all of the liquid seals. The vapor space then is filled, initially, with air at atmospheric pressure which is purged over a period of time by the degassers 68 before normal operation is attained.

When the apparatus is in operation and purging is complete, essentially vapor-liquid equilibrium conditions exist in the drum 11, and the vapor in the central portion is slightly below saturation pressure for the prevailing water temperature, adjusting automatically in accordance with any change in water temperature. The liquid in the outer annular layer 22 is centrifugally accelerated and held against the inside surface of the drum, and forms a surface of revolution in contact with the vapor space. The centrifugal force field thus is directed perpendicularly into the liquid surface.

From the standpoint of operating theory, it will be seen that molecules in the liquid layer 22 are constrained to rotate with the liquid and are subject to centrifugal force, which tends to suppress vaporization since each molecule, to leave the liquid, must overcome the centrifugal force in addition to the intermolecular attractive forces which oppose vaporization. This, in effect, increases the threshold energy requirement by an amount equal to the kinetic energy of rotation of the molecule, and the additional energy increment must be derived from the component of molecular velocity directed radially inwardly. The net effect is a lower vaporization rate and vapor pressure than that which would exist if the liquid surface were not rotating.

Those molecules which do succeed in vaporizing do not, on the average, experience a net loss of kinetic energy since a tangential velocity component equal to the speed of rotation is imparted to them as they leave the liquid. The kinetic energy due to this tangential velocity equals the energy lost during vaporization in overcoming centrifugal force. Thus, the effect of liquid surface rotation on the normal kinetic energy distribution of vaporizing molecules is that of a high band pass filter. Macroscopically, this results in an increased vapor temperature adjacent the liquid surface which is used as a process driving potential.

A similar action is obtained in the evaporating container 15 where the liquid sprayed into the container adjacent the axis of rotation and centrifugally collected against the inside of the wall of the container also is subjected to centrifugal suppression. Since the vapor pressure reduction and temperature increase at the liquid surfaces are proportional to the distances from the axis 13 of rotation, these effects are greater at the distillate surface, which is spaced outwardly from the distalland surface. Moreover, the liquid spray is in free flight after leaving the diffuser nozzles 59a, and is not constrained to rotate, thus not being subjected to centrifugal suppression. The result is condensation at the distillate surface with an accompanying increase in distillate temperature, and vaporization in the evaporating container with a reduction in distilland temperature due to the transfer of latent heat.

Of course, the centrifugal compression of the vapor outside the evaporating container 15 produces additional driving potential and increases net condensation at the distillate surface by increasing the pressure of the vapor adjacent the distillate surface and the heat exchanger coil 20b. The distillate condensing on this coil is thrown off centrifugally to maintain a low film thickness and a correspondingly high heat transfer coefficient.

It has been calculated that a unit of the foregoing type having an outside diameter of five feet and rotating at two thousand r.p.m., with a seawater feed rate producing a distilland concentration of fourteen percent dissolved solids (four times the natural concentration), will attain a distillate temperature at equilibrium approximately 10° F. higher than the distilland temperature, and a somewhat higher differential between the vapor and the distilland. The operating temperature depends primarily upon the seawater feed temperature, feed rate, concentration, distilland surface turnover (which is high because of the manner of introducing and circulating fluids), external ambient temperatures, and thermal characteristics of the unit. Since the unit is essentially a heat pump and may be designed to maximize cooling of distilland or heating of the distillate, operating temperatures over a wide range are possible. A distilland bulk temperature of 90° F. or less will virtually eliminate scale formation on the tubing in contact with the distilland.

The modification of the invention shown fragmentarily in FIGS. 2 and 3, in which corresponding parts are indicated by the same reference numbers used in FIG. 1, is designed to operate primarily as a heat pump, as suggested above, for refrigerating a portion of the input liquid by vaporization while heating the remainder of the stream by vapor condensation. For these purposes, proportioning valves 110 in the inlet pipes 45 leading from the input pump 41 to the spray nozzles 49 divide the input flow into two streams, a distilland stream and a condensing stream, which preferably are equal. The distilland stream, as before, is directed from each valve 110 to the header 48 and is sprayed into the evaporating container 15, while the condensing stream flows radially outwardly from the valve through a pipe 111 leading to an annular header 112 beneath the upper end wall 27 adjacent the annular distillate layer 22.

From this header 112, the condensing liquid is discharged onto a plurality of downwardly and outwardly inclined troughs 113 circumferentially spaced around the inside of the drum, to be spread centrifugally on the inner surfaces of the troughs and to flow downwardly thereon. A plurality of the troughs 113 alternate circumferentially with similar, upwardly and outwardly inclined troughs 114 which receive the condensing liquid around the lower ends 113 of the troughs 113, the liquid also being centrifugally spread on the troughs 114 while flowing upwardly and outwardly towards ports 114a at the upper ends of these troughs. When the condensing liquid reaches these ports, it is discharged into the outer annular layer 22.

With this arrangement, the troughs 113 and 114 provide a large condensing surface area with high surface turnover and thermal mixing for condensation of vapor produced in the evaporating container 15. The condensing liquid is heated and slightly diluted while the distilland stream is cooled and concentrated.

Because of the high latent heat of vaporization of water, a relatively low mass transfer rate is required to produce near equilibrium temperatures in the two streams. The difference in normal vapor pressures of the two streams, due to concentration differences, likewise is very small. Accordingly, the driving potentials of the heat pump in FIG. 2 are almost entirely converted into the thermal potential represented by the temperature difference between the ejected distilland and condensing streams.

The modification shown in FIGS. 2 and 3 is designed primarily as a distillation unit to use preheated distilland feed fed into the input pump 41 through the feed pipe 40 and the valve 91 which is opened and closed by the controller 94 in response to level changes sensed by the probe 93, as in the first embodiment. The distilland is vaporized in the same manner, but the heat exchanger 20 is supplied with coolant through a separate feed pipe 115 and a second rotary input pump 117 disposed outside the main pump 41 and having two submerged outlet ports 118 opening into the upper ends of two heat exchanger coils 20a and 20b. At their lower ends, the coils terminate in nozzles 119 which project through the lower end wall 28 and dischage the coolant into a gutter 120 for recycling or removal.

Since the coolant system is entirely sealed from the vapor space, there is no need for liquid seals at the inlet ports 118 or the nozzles 119. The coils 20a and 20b are radially spaced, as before, with the inner coil 20b in the vapor space to condense vapor and with the coil 20a in the distillate layer 22 to cool this layer as well. A trap 23a preferably is incorporated in the distillate outlet pipe outside the sidewall of the drum, in place of the trap 23 of FIG. 1.

Figure 7:
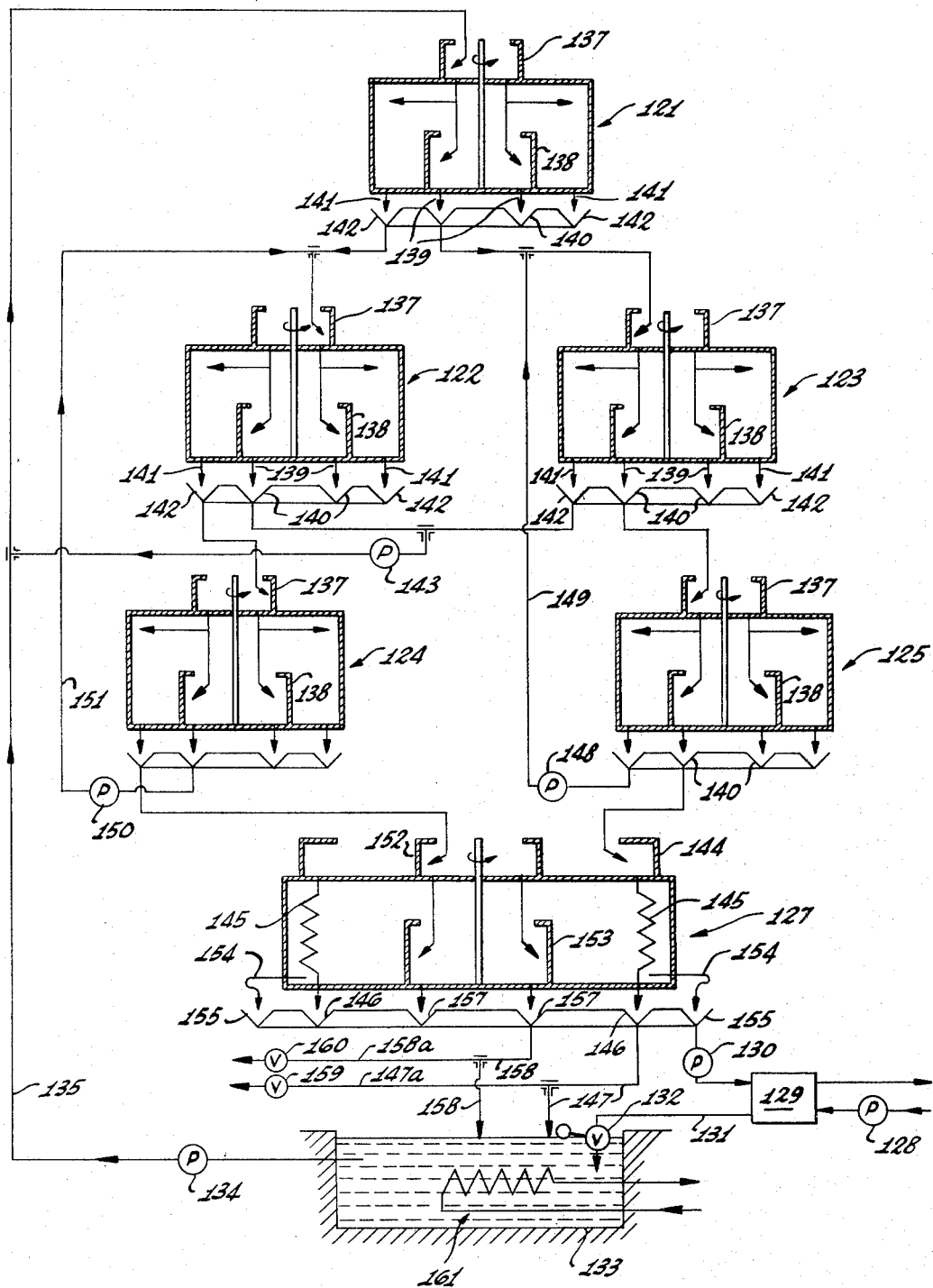
FIG. 7 is a schematic flow diagram illustrating the combination of several heat pump stages with a distillation unit of the type in FIG. 4.
Figure 8:
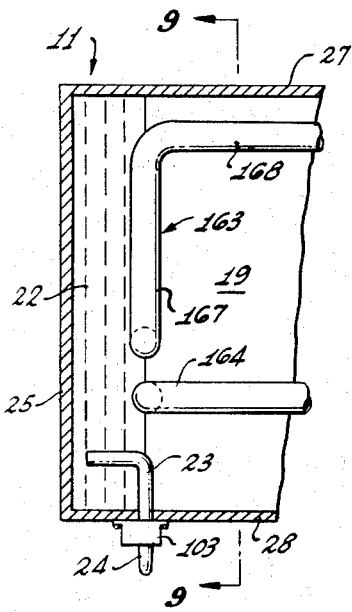
FIG. 8 is a fragmentary cross-sectional view similar to part of FIG 1 and illustrating a modified form of the heat exchanger for improved heat exchange properties.

The schematic diagram in FIG. 7 illustrates the combination of a plurality of the heat pump units 121–125 of the type shown in FIG. 2 with a distillation unit 127 of the type shown in FIG. 4, in a system in which the heat pump units are used to refrigerate part, and heat part, of the liquid streams preparatory to feeding the same into the distillation unit. Raw distilland input is introduced into the system by a pump 128, through a heat exchanger 129 recovering heat from the distillate output of the system, which is pumped through the exchanger by a pump 130. The input is through a pipe 131 leading from the heat exchanger through a float-controlled valve 132 to a reservoir 133, from which the distilland is drawn by a pump 134 which delivers it through a pipe 135 to the rotary input pump 137 of the upper heat pump unit 121.

In this unit, the cooled distilland stream collected in the evaporating container 138 exits through nozzles 139 into a gutter 140 from which it is fed into a second-stage heat pump unit 123, while the condensing stream exits through the nozzles 141 into a gutter 142 and is fed into another second-stage heat pump unit 122. Each of the second-stage units similarly divides its inputs into two streams, the collected distilland stream of the unit 123 being fed through nozzles 139 and a gutter 140 into a third-stage unit 125 on the right while the condensing stream from nozzles 141 and a gutter 142 is combined with the distilland stream of the left second-stage unit 122 and returned by a pump 143 to the pipe 135 for recycling through the first stage unit 121. The condensing stream from the left second-stage unit 122 is fed into a third-stage unit 124 shown on the left.

The distilland output of the right third-stage heat pump unit 125 is fed from a gutter 140 to the heat exchanger pump cylinder 144 of the final distillation unit 127 to circulate through the coils 145 thereof, from which the flow is returned to the reservoir 133 through a gutter 146 and a pipe 147, while the condensing stream flow from the third-stage heat pump 125 is returned by a pump 148 and a pipe 149 to the input flow to the second-stage unit 123. The distilland stream from the third-stage unit 124 is returned by a pump 150 and a pipe 151 to the input of the second-stage unit 122, while the condensing stream flow is fed into the input pump 152 of the final distillation unit 127 and thus introduced into the evaporating container 153 therein. The vapor formed in this unit is condensed as distillate around the heat exchanger coils 145, removed through outlet pipes 154, and collected in a gutter 155 from which the pump 130 discharges the distillate through the heat exchanger 129. The distilland collected in the evaporating container 153 is discharged to a gutter 157 and returned to the reservoir through a pipe 158 for recycling.

A portion of the coolant discharged from the final distillation unit 127 may be removed through a pipe 147a and a valve 159 and discharged, and a portion of the distilland flowing back toward the reservoir 133 through the pipe 158 similarly may be discharged through a pipe 158a and a valve 160. A heat exchanger 161 is shown in the reservoir for adding or removing heat from the reservoir to prepare the liquid therein for recycling.

Typically, the temperature of the distilland stream discharged form each heat pump unit 121–125 will be on the order of 5° F. lower than its input stream, and the temperature of the discharged condensing stream will be on the order of 5° F. higher than the temperature of the feed stream. Thus, as illustrated in FIG. 7, the coolant temperature in the heat exchanger 145 of the final distillation unit 127 will be approximately 30° F. lower than the temperature of the distilland fed into the evaporating container 153. This temperature differential, plus the centrifugally produced driving potentials, will produce relatively high rates of distillation.

Another advantage of the present invention is that the coils of the heat exchanger in the condensing zone 19 and in the layer 22 of distillate collected around the condensing zone can be shaped and arranged, if desired, to maximize the swirl of cooling liquid circulated through the coils, thereby significantly enhancing heat exchange between the cooling liquid and the coils. For this purpose, at least some portions of the coils are disposed at right angles to the direction of rotation to produce swirling of the cooling liquid as a result of the coriolis force.

As shown in FIGS. 8 through 11, in which corresponding parts are indicated with the same reference numbers used in FIG. 1, this may be accomplished in various ways. For example, in FIGS. 8 and 9, the illustrative heat exchange coil 163 has a lower, inlet end portion 164 which extends radially outwardly from the inlet header (not shown in FIGS. 8 and 9) toward the sidewall 25 of the drum 11, then is bent generally at a right angle and extends at 165 along an arc concentric with the drum, and then is bent back and forth vertically (see FIG. 9) in a zigzag fashion as indicated at 167, while remaining substantially equidistant from the sidewall and progressing back around the inner side of the sidewall. At a selected point, the coil extends back radially inwardly at 168 to the return header 57 (not shown in FIGS. 8 and 9). Thus, the U-shaped, zigzag sections numbered 167 have parts perpendicular to the direction of rotation and promoting swirling as a result of the coriolis force.

Figure 10:
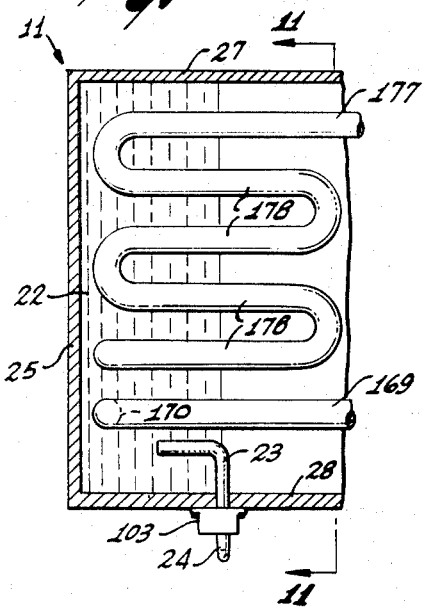
FIG. 10 is a view similar to FIG. 8 showing a second modified form.

Similarly, as shown in FIGS. 10 and 11, wherein corresponding parts are indicated by corresponding reference numbers of FIG. 1, the coil may extend radially outwardly as at 169 from the inlet header, then along the drum sidewall at 170, then upwardly along the sidewall at 171 (FIG. 11), and then back and forth in U-shaped, zigzag fashion as at 172, radially inwardly and outwardly, while progressing upwardly. This arrangement also disposes parts of the coil perpendicular to the direction of rotation.

After approaching the upper end wall 27 of the drum, the coil extends at 173 along the top wall of the drum to another set of zigzag, U-shaped bends 174 similar to the bends 172, and, from the lower end of this set, extends to another set 175. This is continued around the drum to an outlet portion 177 of the coil, leading from the upper end of the last set of bends 178 to the return header, as before.

It will be seen in FIGS. 8–11 that the coil 163 may be wholly or partly immersed in the distillate layer 22, with a similar coil spaced inwardly to lie in the vapor space.

The coil shown in FIGS. 10 and 11 can be arranged to extend into and out of the layer, both to cool the distillate and to condense vapor in the vapor space.

While specific embodiments of the present invention have been illustrated and described with particularity herein, it will be readily apparent to those skilled in the art that various changes and different embodiments may be made without departing from the spirit and scope of the invention.

I claim:

1. A centrifugal flash-evaporation/vapor compression distillation, apparatus having, in combination:
   a sealed rotary drum mounted for rotation about a central upright axis and having closed upper and lower ends, an inner evaporating zone, and an outer condensing zone surrounding said evaporating zone;
   means for rotating said drum about said axis;
   an evaporating container coaxially mounted in said drum for rotation therewith and having a sidewall of circular cross-section separating said zones from each other and an upper end wall spaced below said upper end and formed with a central opening for the escape of vapor from said evaporating zone;
   means for purging said drum of air and creating a vapor space therein including the central part of said evaporating zone and the inner part of said condensing zone around said evaporating container;
   means for introducing liquid into said drum while the latter is rotating and spraying the liquid into said evaporating container, thereby to form a first annular layer of liquid around the inner side of said sidewall and to cause part of the liquid to flash into vapor within said container and to flow from out of the container through said opening and toward said condensing zone to be compressed centrifugally therein while the liquid in said layer is cooled by loss of sensible heat, said introducing means including a plurality of nozzles arranged around the upper end of said evaporating container to direct sprays of liquid into said evaporating zone, supply means outside said container communicating with said nozzles to deliver liquid thereto under pressure, and a header mounted in said drum to receive liquid from said supply means and distribute the same to said nozzles;
   a fluid-circulating heat exchanger positioned in said condensing zone for contact with the vapor therein;
   means for circulating cooled liquid from said first layer through said heat exchanger thereby to cool the latter and condense vapor thereon as distillate in said condensing zone and form a second annular layer of such distillate around the outer side of said condensing zone and said vapor space, said circulating means including a second header communicating with said heat exchanger to receive liquid therefrom, and suction means acting between said nozzles and said second header to use the jet action of the nozzles to draw liquid from said heat exchanger and recycle the same through the evaporating zone,
   and means for withdrawing distillate from said second annular layer and discharging the distillate from said apparatus.

2. A centrifugal flash-evaporation/vapor-compression distillation apparatus as defined in claim 1 in which said means for circulating cooled liquid through said heat exchanger receives liquid from said first annular layer and returns the liquid after passing through said heat exchanger to said introducing means for recycling through said evaporating container.

3. A centrifugal flash-evaporation/vapor-compression distillation apparatus as defined in claim 1 further including a deflector inside said evaporating chamber cooperating with said nozzles to vaporize the liquid.

4. A centrifugal flash-evaporation/vapor-compression distillation apparatus as defined in claim 1 in which said supply means include a liquid pump on said upper end having a trough-like sidewall of circular cross-section rotatable with said drum, and having an open upper end for receiving liquid, thereby to form a third annular layer of liquid to be introduced into said drum, said nozzles communicating with said third annular layer in liquid-sealed relation to receive liquid therefrom under pressure created by the centrifugal force resulting from rotation of said pump.

5. A centrifugal flash-evaporation/vapor-compression distillation apparatus as defined in claim 1 in which said heat exchanger includes a heat exchange element immersed in said second annular layer to cool distillate therein and increase condensation on said second layer.

6. A centrifugal flash-evaporation/vapor-compression apparatus having, in combination:
   a sealed rotary enclosure having an inner evaporating zone and an outer condensing zone around said evaporating zone;
   means internally partitioning said enclosure to separate said zones while permitting vapor to escape from said evaporating zone to said condensing zone;
   means for rotating said enclosure about a central axis extending through said evaporating zone;
   means for purging said enclosure and creating a vapor space within said zones;
   means for introducing liquid into said evaporating zone and causing a portion of the liquid to vaporize therein, said partitioning means being shaped to collect unevaporated liquid in a first annular layer around said evaporating zone;
   a liquid-circulating heat exchanger in said condensing zone;
   means for circulating relatively cool liquid through said heat exchanger thereby to condense centrifugally compressed vapor from said evaporating zone in said condensing zone and to collect the condensed vapor as distillate in a second annular layer around said condensing zone;
   a degasser including a coil positioned to lie within said first annular layer, said coil having an inlet end disposed in said vapor space, and outlet end, and means for drawing vapor and other gases from said vapor space through said coil to condense the vapor therein, discharging the gases from the enclosure, and delivering the condensed vapor as distillate to said second annular layer;
   and means for withdrawing distillate from said second annular layer and discharging the distillate from said enclosure.

7. The apparatus as defined in claim 6 in which said liquid-circulating means circulate liquid from said first annular layer, cooled by vaporization, through said heat exchanger and return the liquid from said heat exchanger to said evaporating zone for recycling.

8. The apparatus as defined in claim 6 in which said liquid-introducing means include a pump, spray nozzles communicating with said pump to direct liquid into said evaporating zone, and a dished, rotating deflector in said evaporating zone for assisting in vaporizing the liquid.

9. The apparatus as defined in claim 6 in which said partitioning means include an evaporating container coaxial with said enclosure and having an opening in one end for escape of vapor, a sidewall for collecting liquid in said first annular layer, and baffles preventing the escape of liquid with vapor through said opening.

10. The process of concentrating and cooling a portion of a liquid solution feed stream by causing evaporation therefrom while simultaneously diluting and heating the remainder of the stream by condensation of the resulting vapor thereon, comprising the steps of:
    introducing the feed stream into a sealed enclosure;
    dividing the feed stream into two secondary streams and introducing one of said secondary streams into the central portion of said enclosure at below saturation pressure, thereby causing a portion of said one stream to vaporize;

introducing the other of said secondary streams into the outer portion of the enclosure and retaining it therein while spreading it to form a relatively large surface area;

subjecting the liquid and vapor in the enclosure to a centrifugal force field by rotating the enclosure while retaining unevaporated liquid from said one stream in the central portion of the enclosure and permitting the vapor therefrom to escape to, and be centrifugally compressed in, the outer portion of the enclosure, thereby condensing vapor on the surface of the liquid of said other stream retained therein;

withdrawing the unevaporated solution from the central portion of the enclosure as a cooled and move concentrated liquid;

and withdrawing liquid from the outer portion of the enclosure as a warmer and diluted solution.

11. The process defined in claim 10 wherein the feed stream is a relatively pure liquid and the system operates solely as a heat pump.

12. The process defined in claim 10 in which liquid is removed from said enclosure and, as an incident to such removal, is directed rearwardly relative to the direction of rotation of the enclosure to recover kinetic energy of rotation.

13. In a centrifugal flash-evaporization/vapor-compression apparatus having a sealed enclosure rotatable about a central axis and partitioned by an open container into an inner evaporating zone and an outer condensing zone, means for introducing liquid into said inner zone to partially evaporate therein for escape to said outer zone and also to form a first annular liquid layer around said inner zone within said open container, a liquid-circulating heat exchanger in said outer zone for cooling the vapor, and means for centrifugally compressing the vapor in said outer zone to cause the vapor to condense in said outer zone and collect around the periphery thereof, the improvement in which said liquid-introducing means comprise:

means mounted on the outside of and rotatable with said enclosure and defining an inlet chamber having a sidewall coaxial with the enclosure;

supply means for introducing liquid into said inlet chamber while the latter is rotating, thereby to form a second annular liquid layer around said sidewall when the enclosure is rotating;

and conduit means extending from said chamber into said enclosure, said conduit means having an inlet positioned in said chamber adjacent said sidewall to be submerged in said second layer, a first portion extending radially inwardly from said inlet, a second portion extending into said enclosure and sealed therein, and an outlet inside said enclosure, whereby said conduit means receive liquid from the second liquid layer and carry it under centrifugally produced pressure into said enclosure, while being sealed by the second liquid layer against the entry of air into the enclosure.

14. The improvement as defined in claim 13 in which said container has a sidewall of circular cross-section around which said second layer is formed, an annular wall overlying the annular area in which the second layer is formed, and a central opening through which liquid is introduced.

15. The improvement as defined in claim 14 in which said conduit means comprise a plurality of inlet pipes each having an inlet end spaced radially inwardly from said sidewall, first portion extending farther inwardly to cooperate with said second layer in forming the seal, and a second portion extending axially into the enclosure.

16. The improvement as defined in claim 13 in which said conduit means extend into said enclosure and communicate therein with means for spraying the liquid into said inner evaporating zone under centrifugally produced pressure.

17. The improvement as defined in claim 16 in which said means for spraying include spray nozzles arranged around said inner zone and directed inwardly toward said axis.

18. The improvement as defined in claim 17 in which said liquid-circulating heat exchanger includes a coil, and means for supplying cooling liquid from said first layer to one end of said coil, and further including suction means actuated by said spray nozzles for drying cooling liquid from said coil and directing the liquid into said inner evaporating zone.

19. The improvement as defined in claim 18 in which said means for supplying cooling liquid include at least one inlet header around said evaporating zone and arranged to be filled with liquid from said first layer, and inlets between said coil and said header for admitting liquid into the coil, whereby centrifugally produced pressure assists in forcing cooling liquid into said coil, and said suction means assist in drawing the cooling liquid out of the coil after circulation therethrough.

20. In a centrifugal flash-evaporization/vapor compression apparatus having a sealed enclosure rotatable about a central axis and partitioned by an open container into an inner evaporating zone and an outer condensing zone, means for introducing liquid into said inner zone to partially evaporate therein for escape to said outer zone and also to form an annular liquid layer around said inner zone within said open container, a liquid-circulating heat exchanger in said outer zone for cooling the vapor, and means for centrifugally compressing the vapor in said outer zone to cause the vapor to condense in said outer zone and collect around the periphery thereof, the improvement in which said means for introducing liquid comprises:

sealed feed means for carrying liquid into said enclosure under pressure while the enclosure is rotating;

spray nozzle means arranged around said axis and directed inwardly into said inner evaporation zone to spray the liquid into the inner zone under pressure;

means for admitting liquid from said liquid layer into said heat exchanger under centrifugally produced pressure to circulate through the heat exchanger and be heated therein, said heat exchanger having an outlet for returning heated liquid to said liquid layer after such circulation;

and means for generating suction at said outlet in response to the spraying action of said spray nozzle means, thereby cooperating with the centrifugally produced pressure and the convective action produced by the heating of the liquid, to circulate liquid from said layer through said heat exchanger and back to said layer.

21. The improvement defined in claim 20 in which said sealed feed means supply the liquid to a first header in said enclosure, and said spray nozzle means comprise a plurality of nozzles communicating with said header to receive liquid therefrom, said nozzles being directed toward said axis.

22. The improvement defined in claim 21 in which said suction-generating means are liquid jet pumps through which sprays from said spray nozzles are directed so as to entrain liquid within the jet pumps and thereby produce the suction.

23. The improvement defined in claim 21 in which said means for admitting liquid to said heat exchanger include at least one second header around the outer side of said inner evaporating zone and communicating therewith to be filled with liquid from said layer, said heat exchanger having an inlet opening into said second heater.

24. The improvement defined in claim 20 in which said suction-generating means include additional nozzle means for directing the liquid drawn from said heat exchanger inwardly toward said axis for optimum evaporation.

25. The improvement defined in claim 24 in which said spray nozzle means include a plurality of first nozzles for directing jets of liquid from said feed means along paths extending inwardly toward said axis, and said additional nozzle means include second nozzles disposed around said paths to entrain liquid from said outlet and direct the same inwardly with said jets.

26. The improvement defined in claim 20 in which said heat exchanger includes a coil having an inlet end opening into said container to receive liquid from said layer under pressure, an outlet end opening back into said container through said suction-generating means, and a portion between said ends spiraling around said axis with a progressively decreasing radius to promote convective flow of liquid through the coil.

27. In a centrifugal flash-evaporization/vapor compression apparatus having a sealed enclosure rotatable about a central axis and partitioned by an open container into an inner evaporating zone and an outer condensing zone, means for introducing liquid into said inner zone to partially evaporate therein for escape to said outer zone and also to form an annular liquid layer around said inner zone within said open container, a liquid-circulating heat exchanger in said outer zone for cooling the vapor, and means for centrifugally compressing the vapor in said outer zone to cause the vapor to condense around said outer zone and collect around the periphery thereof, the improvement which comprises:

a degasser in the form of a conduit disposed partially within said container to lie within said liquid layer, said conduit having an open inlet end opening into said outer condensing zone adjacent said container, and an outlet end communicating with the exterior of said rotatable enclosure, and means for drawing vapor and other gases through said coil to condense the vapor therein, discharging the gases from the enclosure, and delivering the condensed vapor as distillate to said outer zone.

28. The improvement defined in claim 27 in which the last-mentioned means include an exhauster jet opening out of said container and said enclosure to eject a limited flow of liquid therefrom along a preselected path under centrifugally produced pressure, and means for producing suction in response to the flow from the exhauster jet and applying the suction to said outlet end to draw gases therefrom and discharge the gases with the liquid flow from the enclosure.

29. The improvement defined in claim 28 in which said degasser includes a coil constituting part of said conduit and disposed within said liquid layer to cool and condense vapor drawn in through said inlet end with said other gases, and means for centrifugally separating the condensed vapor from the gases and delivering the condensed vapor to said outer zone.

30. In a centrifugal flash-evaporization/vapor-compression apparatus having a sealed enclosure rotatable about a central axis and partitioned by an open container into an inner evaporating zone and an outer condensing zone, means for introducing liquid into said inner zone to partially evaporate therein for escape to said outer zone and also to form a first annular liquid layer around said inner zone within said container, a liquid-circulating heat exchanger in said outer zone for cooling the vapor, and means for centrifugally compressing the vapor in said outer zone to cause the vapor to condense in said outer zone and collect around the periphery thereof in a second layer, the improvement which comprises:

a solids-separation chamber constituting an outward extension of said inner evaporating zone to be filled with liquid from said second layer, said chamber having an open side facing radially inwardly to receive solid particles urged outwardly in said liquid layer by centrifugal force;

and means for exhausting a limited flow of liquid from the outer portion of said chamber, and thus from said first liquid layer, and carrying the limited flow out of said enclosure, thereby to remove solid particles displaced outwardly in said chamber by centrifugal force.

31. The improvement defined in claim 30 further including degassing means for collecting noncondensible gasses from said outer zone and exhausting the gases from said enclosure, including a conduit having an inlet in said outer zone adjacent said container, and an outlet adjacent said exhausting means, and further including means for drawing gases through said conduit and exhausting the same with said solids.

32. The improvement defined in claim 31 in which said exhausting means comprise at least one outlet pipe for passing a flow of liquid out of said chamber under centrifugally produced pressure, and said degassing means include a suction device operated by said flow of liquid and operable to apply suction to the outlet of said conduit.

33. The improvement defined in claim 32 further including means for condensing vapor withdrawn with said gases, separating the condensed vapor from the gases, and returning the condensed vapor to said second liquid layer.

34. In a centrifugal flash-evaporation/vapor-compression apparatus having a sealed enclosure rotatable about a central axis and partitioned by an open container into an inner evaporating zone and an outer condensing zone, means for introducing liquid into said inner zone to partially evaporate therein for escape to said outer zone and also to form an annular liquid layer around said inner zone within said open container, a liquid-circulating heat exchanger in said outer zone for cooling the vapor, and means for centrifugally compressing the vapor in said outer zone to cause the vapor to condense around said outer zone and collect around the periphery thereof, the improvement comprising:

at least one outlet conduit for limiting the level of said liquid layer, said outlet conduit having an inlet end adjacent the inner side of said container to be immersed in the liquid layer, a first portion extending radially inwardly a preselected distance from said inlet end toward said axis, and a second portion extending from said first portion out of said enclosure between said inlet and said axis in sealed relation with said enclosure, whereby the liquid in said layer seals said conduit against the entry of outside air, and liquid introduced into the layer tending to increase the radial depth thereof inwardly beyond said second portion is forced out through the conduit by centrifugally produced pressure.

35. In a centrifugal flash-evaporation/vapor-compression apparatus having a sealed enclosure rotatable about a central axis and partitioned by an open container into an inner evaporating zone and an outer condensing zone, means for introducing liquid into said inner zone to partially evaporate therein for escape to said outer zone and also to form a first annular liquid layer around said inner zone within said open container, a liquid-circulating heat exchanger in said outer zone for cooling the vapor, and means for centrifugally compressing the vapor in said outer zone to cause the vapor to condense around said outer zone and collect around the periphery thereof, the improvement which comprises:

sealed feed means for carrying liquid into said enclosure under pressure while the enclosure is rotating:

means for directing the liquid from said feed means into said inner evaporating zone to be vaporized therein;

means for admitting liquid from said first liquid layer into said heat exchanger to circulate through the heat exchanger in said outer zone; and means for collecting the condensed liquid in said outer zone around the periphery thereof and maintaining the condensed liquid at a preselected radial depth;

said heat exchanger having a portion spaced from said periphery a distance less than said preselected depth to be immersed in said collected condensed liquid to cool the liquid and recover heat therefrom.

References Cited
UNITED STATES PATENTS

| | | | |
|---|---|---|---|
| 3,580,817 | 5/1971 | Schnur | 203—11 |
| 2,370,464 | 2/1945 | Hickman | 202—236 X |
| 2,894,879 | 7/1959 | Hickman | 202—236 X |

NORMAN YUKOFF, Primary Examiner

D. EDWARDS, Assistant Examiner

U.S. Cl. X.R.

203—89, 11, 91; 202—236, 238, 187; 159—6